United States Patent [19]
Leon

[11] Patent Number: 5,500,487
[45] Date of Patent: Mar. 19, 1996

[54] MODULAR PULL-OUT ASSEMBLY

[75] Inventor: George S. Leon, Trujillo Alto, Puerto Rico

[73] Assignee: Commonwealth of Puerto Rico, San Juan, Puerto Rico

[21] Appl. No.: 133,863

[22] Filed: Oct. 12, 1993

[51] Int. Cl.⁶ .................................................. H02G 3/18
[52] U.S. Cl. ........................... 174./53; 200/297; 439/535
[58] Field of Search ............................. 174/53; 200/293, 200/297; 439/535

[56] References Cited

U.S. PATENT DOCUMENTS

| | | | |
|---|---|---|---|
| 2,397,688 | 4/1946 | Osinski | 174/53 |
| 2,433,917 | 1/1948 | McCartney | 174/53 |
| 2,734,115 | 2/1956 | Dupre | 200/293 |
| 3,737,592 | 6/1973 | Lay | 200/51.14 |
| 3,858,161 | 12/1974 | Champion et al. | 174/53 X |
| 4,045,629 | 8/1977 | Anzani | 200/52 R |
| 4,165,443 | 8/1979 | Figart et al. | 174/53 |
| 4,295,018 | 10/1981 | Borrelli | 174/53 |
| 4,485,282 | 11/1984 | Lee | 200/51 R |

*Primary Examiner*—Kristine L. Kincaid
*Assistant Examiner*—David A. Tone
*Attorney, Agent, or Firm*—Oblon, Spivak, McClelland, Maier & Neustadt

[57] ABSTRACT

A modular receptacle includes opposing contacts as well as receiving portions. The receptacle slidably receiving a switch or plug therein. The switch or plug having opposing contacts which contact the opposing contacts on the receptacle and also having indented and protruding portions which cooperate with the receiving portions in the receptacle. Thus, switches or plugs can be selectively removed or inserted from the modular receptacle without the need to remove the receptacle from a wall on which the receptacle is mounted.

6 Claims, 5 Drawing Sheets

MODULAR PULL-OUT ASSEMBLY

BACKGROUND OF THE INVENTION

1. Field of the Invention

The present invention relates to a modular pull-out switch assembly having a receptacle for receiving at least one switch or plug therein. The switches and plugs being selectively removably insertable into the receptacle by way of cooperating, protruding and indented portions on the receptacle and on each of the plugs or switches.

The modular pull-out switch assembly of the present invention permits the selective replacement of a plug or switch located in the receptacle without the need for pulling the receptacle out of the wall or cutting off the main power supply to the receptacle.

2. Description of the Related Art

In conventional wall switch assemblies, if a repair is to be made, it is usually necessary to cut off the main power supply and also remove the entire base plate. Also, repeated repair may damage the threads on the base plate which will make it necessary to also replace the entire base plate.

Additionally, some conventional wall switches utilize complicated latching and locking mechanisms for maintaining switches or plugs in the base plate. These complicated latching and locking mechanisms make it difficult to easily remove and replace a selected switch or plug and also make it difficult to interchange switches or plugs once they are initially installed.

SUMMARY OF THE INVENTION

An object of the present invention is to provide for a novel modular pull-out switch assembly which permits the slidable insertion of selected plugs or switches into a receptacle and also permits the easy removal of selected switches or plugs from the receptacle. The present invention also relates to switches and/or plugs which are easily insertable and removable from the receptacle. Thus, if a repair is necessary, only the selected malfunctioning switch or plug needs to be pulled from the receptacle box. The receptacle box remains in the wall and accordingly there is no need to cut off the main power supply or remove the receptacle box. Therefore, in repeated repairs, there is no damage to the receptacle box. Also, there is no need to remove an entire receptacle box having a plurality of switches or plugs positioned therein when only one switch or plug is malfunctioning.

Accordingly, the present invention relates to a modular pull-out switch assembly comprising a receptacle having first and second opposing walls which comprise opposing electrical contacts with one of the first and second opposing walls comprising a ground means. The receptacle means further comprises third and fourth walls having means for permitting the slidable insertion of at least one switch and/or plug into the receptacle.

The at least one switch and/or plug of the present invention comprises first and second opposing surfaces with electrical contacts, a third surface with an indented portion and a fourth surface opposed to the third surface with a protruding portion. The single switch or plug being removably slidable into the receptacle such that the opposing electrical contacts on the first and second walls of the receptacle respectively contact the opposing electrical contacts on the first and second opposing surfaces of the single switch or plug. Also, the indented portion and protruding portion on the third and fourth surfaces of the single switch are respectively slidably fitted on cooperating portions of the third and fourth walls of the receptacle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
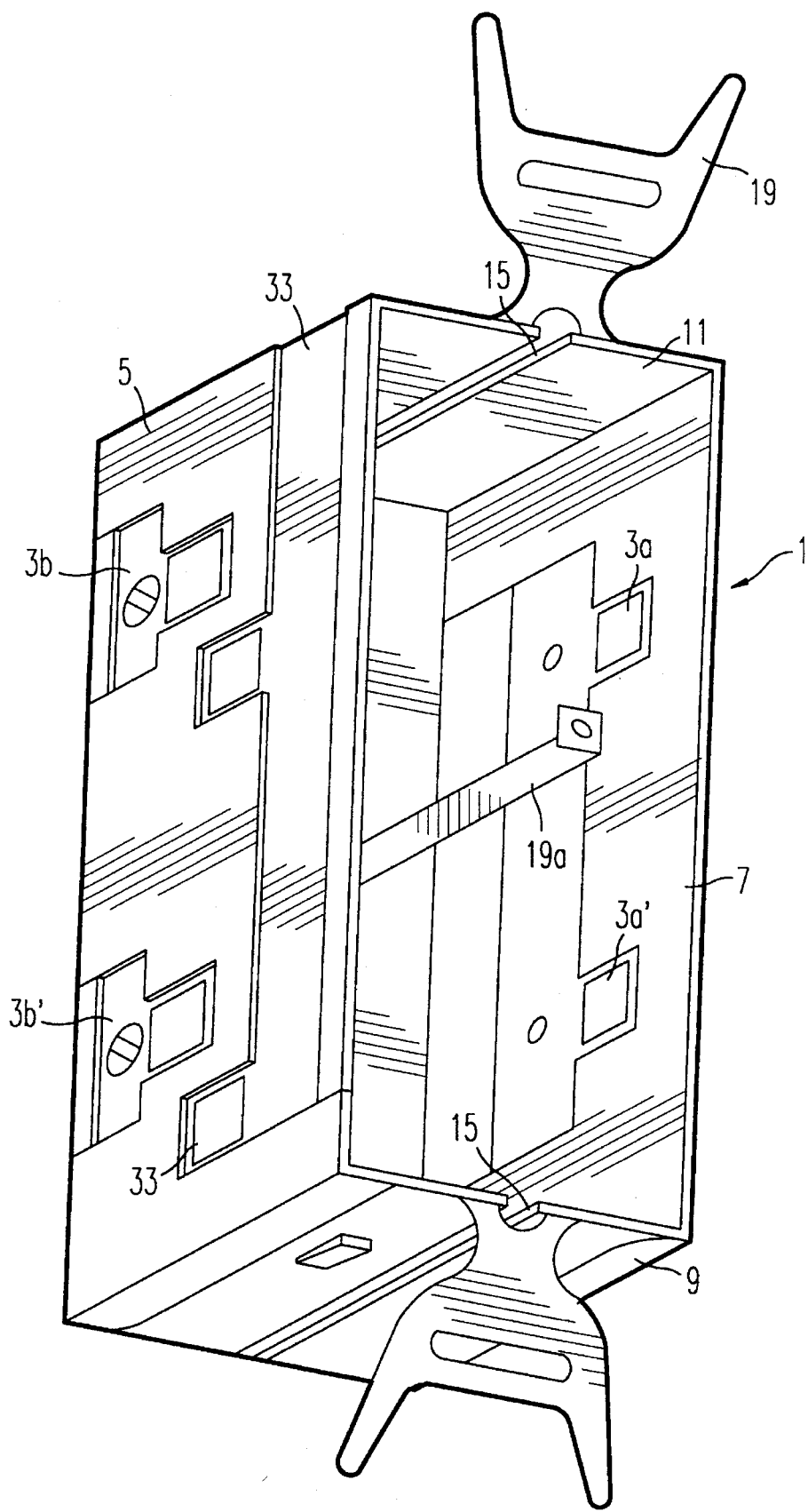
FIG. 1 is a perspective view of an embodiment of the receptacle in which two switches or plugs are fittable therein.

Referring now to the drawings, wherein like reference numerals designate identical or corresponding parts throughout the several views, and more particularly to FIG. 1 thereof, FIG. 1 illustrates a receptacle 1 which can be mounted in a wall surface. The receptacle 1 includes a first pair of opposing walls 5 and 7 and a second pair of opposing walls 9 and 11. The first pair of opposing walls 5 and 7 each include opposing contacts 3a, 3a', 3b, 3b' which contact corresponding contacts on a plug or a switch which is inserted into the receptacle 1 in a modular fashion. The receptacle in FIG. 1 which slidably receives two plugs and/or switches therein is shown for illustrative purposes. It is recognized that depending on design requirements, the receptacle can be modified to receive only one plug and/or switch or to receive three plugs and/or switches. The modular feature of the receptacle 1 of the present invention is particularly applicable to receiving two or more plugs and/or switches since the structure of the receptacle 1 facilitates the insertion and/or removal of the plugs and/or switches. The receptacle 1 also includes a ground 33 which cooperates with a corresponding ground on a switch or plug. The receptacle 1 further comprises receiving portions 15 on the walls 9 and 11. The receiving portions 15 illustrated in FIG. 1 are shown as indented portions. However, they may also be protruding portions or a combination of indented and protruding portions. Also, the receptacle 1 includes surface portions 19 which permit the securement of the receptacle 1 in a wall surface, as well as an extended portion 19a positioned in the middle of the receptacle. The extended portion 19a includes a hole which is adaptable for receiving a screw for holding a top plate of the receptacle when the receptacle is mounted into the wall surface.

Figure 2:
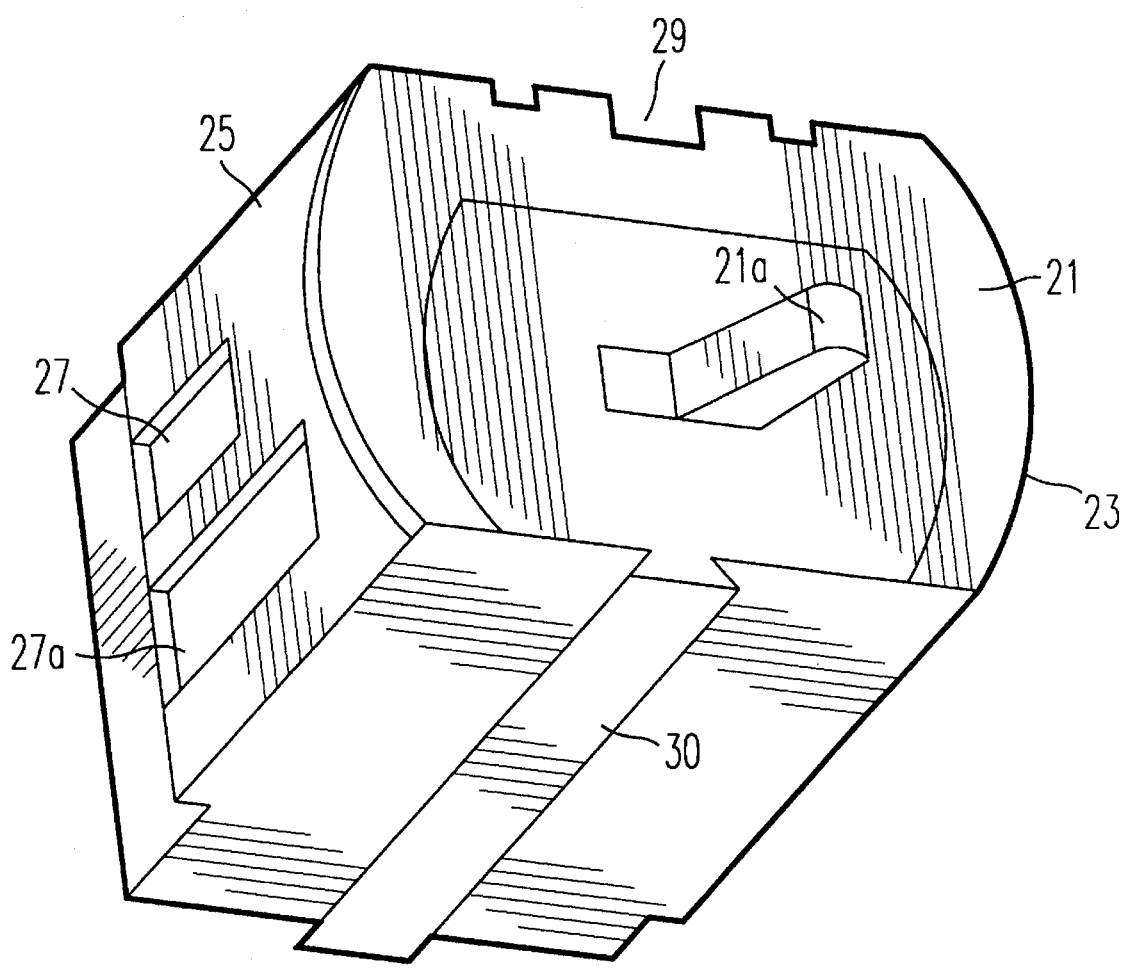
FIG. 2 is a perspective view of a switch box which can be fitted in the receptacle of FIG. 1.

Illustrated in FIG. 2 is a switch 21 which can be removably inserted into the receptacle 1 of FIG. 1. The switch 21 includes opposing surfaces 23 and 25 which each include contacts 27. The contacts 27 cooperate with leads and contacts disposed within the switch which are responsive to the movement of the switch lever 21a. The switch further includes a ground 27a as well as indented portions 29 and a protruding portion 30 on opposing surfaces of the switch. When the switch 21 of FIG. 2 is inserted into the receptacle 1 of FIG. 1, the contacts 27 on the opposing surfaces of the switch respectively contact the contacts 3a and 3b or 3a' and 3b' of the receptacle 1. The protruding portion 30 of the switch 21 can be slidably fitted on the receiving portion 15 of the receptacle 1. If the switch 21 of FIG. 2 is inserted so as to contact the contacts 3a' and 3b' of the receptacle 1, a further switch or plug can also be inserted in the receptacle 1 so as to contact the contacts 3a and 3b. The indented portions 29 of the switch 21 illustrated in FIG. 2 cooperate with cooperating portions on an adjacent switch or plug which is fitted in the receptacle. The choice of indented or protruding portions depends on design characteristics, and portions which permit the modular and slidable insertion and removal of switches and plugs from the receptacle are utilized. Accordingly, each switch or plug can be selectively removed or inserted from the receptacle without the need for removing the receptacle from the wall or the need for removing all of the switches or plugs.

Thus, the switch 21 can be slidably fitted into the receptacle 1 and easily removed from the receptacle. For purposes of making the connection between the switch and the receptacle, all that is necessary is for the insertion of the switch into the receptacle and the cooperating relationship between the protruding and indented portions of the receptacle and switch permit the easy removal and insertion of the switches or plugs into the receptacle.

Figure 3A:
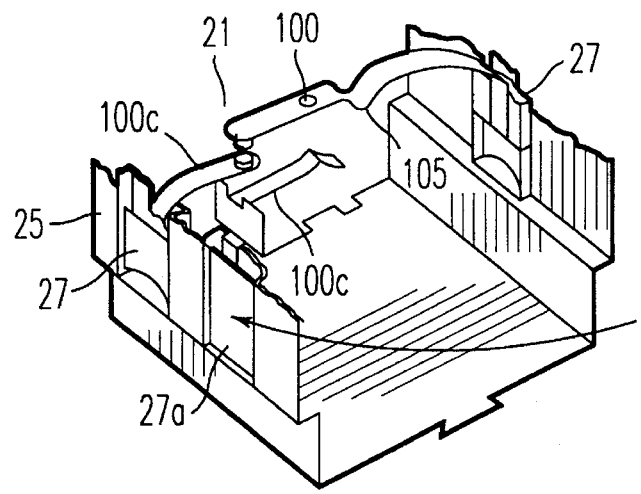
FIG. 3(a) is a perspective view of the interior of the switch box of FIG. 2.
Figure 3B:
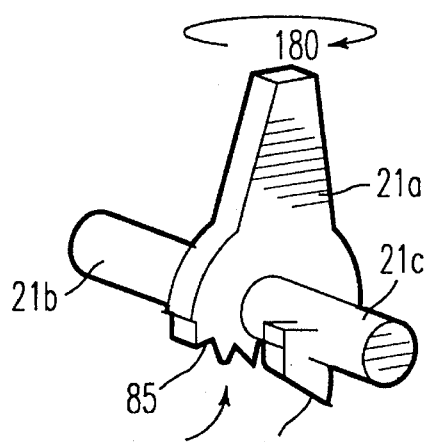
FIG. 3(b) is a perspective view of the switch lever.
Figure 3C:
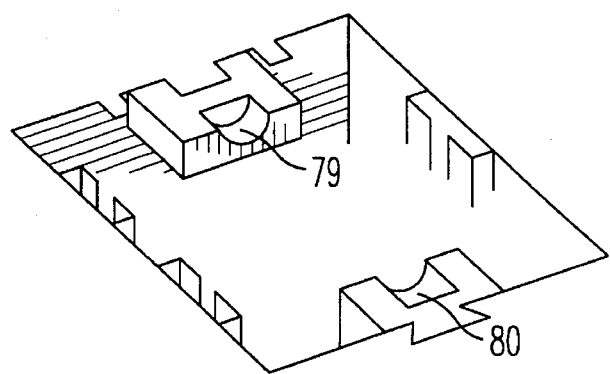
FIG. 3(c) is cut away view of the top of the switch box.

FIGS. 3a–3c illustrate the interior of the switch utilized in the present invention and illustrated in FIG. 2. FIG. 3a illustrates the opposing contacts 27 as well as the ground member 27a. As shown, the switch 21 includes a first cantilevered lever 100 extending from one contact 27 of the switch 21 in a direction toward the opposing contact 27 and a second cantilevered lever 100a extending from the opposing contact 27 of the switch 21 toward the one contact 27. The levers 100 and 100a extend toward each other so as to slightly overlap with a predetermined spacing therebetween. It is further noted that the lever 100 includes a bent portion 105. The switch 21 also includes a cantilevered lever 100c extending from the ground 27a toward the center of the switch 21. The switch lever 21a illustrated in FIG. 3b includes shaft portions 21b and 21c for pivotally mounting the switch on curved portions 79 and 80 illustrated in FIGS. 3c which shows a top view of the box of the switch.

Referring back to FIG. 3b, the switch 21a includes a wedge portion 75 as well as teeth portions 85. When the switch 21a is mounted on the switch box, a pivotal movement of the switch 21a causes the wedge portion 75 to push down on the lever 100 so as to make contact with the lever 100a. The ground lever 100c cooperates with the teeth portions 85. Normally, the levers 100 and 100a are leaf springs and are spaced from each other. A pivotal movement of the switch lever 21a about the shaft portions 21b and 21c causes the wedge 75 to abut against the lever 100 and thereby causes the lever 100 to contact the lever 100a to make the connection between the contacts.

Figure 4:
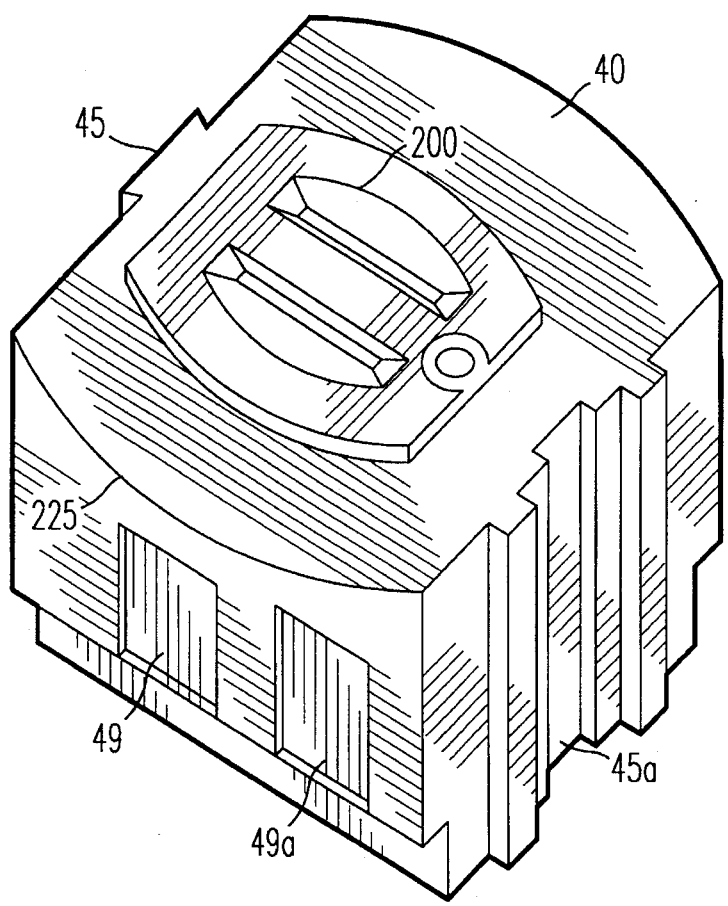
FIG. 4 is a perspective view of a plug which is fittable in the receptacle of FIG. 1.

The above explanation has been made with respect to a switch. However, as illustrated in FIG. 4, a plug 40 including a protruding portion 45 and contacts 49 on opposing surfaces can also be selectively inserted or removed from the receptacle illustrated in FIG. 1. Also, the plugs or switches can be interchangeable so that switches or plugs are selectively insertable in the illustrated receptacles. As noted above, the switch 40 includes a protruding portion 45 which cooperates with the receiving portion 15 of the receptacle 1. However, the plug can also have an indented portion which can cooperate with a protruded portion on the receptacle. The surface of the plug which opposes the surface on which the protruded portion 45 is located, may include indented portions 45a which can cooperate with cooperating portions on an adjacently positioned plug or switch. The plug further includes an inlet 200 which comprises a positive inlet, a negative inlet and a ground.

Thus, the receptacle can provide for a modular arrangement in which a user can selectively insert or remove a plug and/or a switch into or from the receptacle. The cooperating indented and protruding portions on the plugs, switches and receptacle facilitate the removal and insertion of the plugs and switches with respect to the receptacle. Insertion of the plug 40 into the receptacle 1 causes the contacts 49 to contact the contacts 3a, 3b or 3a', 3b' in the receptacle 1, as well as contact with respect to the ground 49a of the plug 40 and the ground portion 33 of the receptacle 1.

Figure 5:
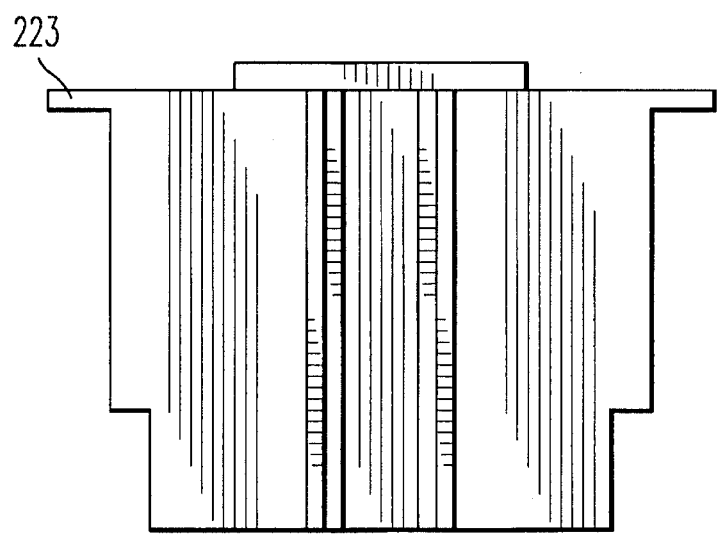
FIG. 5 is a side view of the plug of FIG. 4.

Referring to FIG. 5 which illustrates a side view of the plug, it is noted that the plug includes an overextending portion which serves as a hand grip for facilitating the removal and insertion of the plug into the receptacle box.

Figure 6:
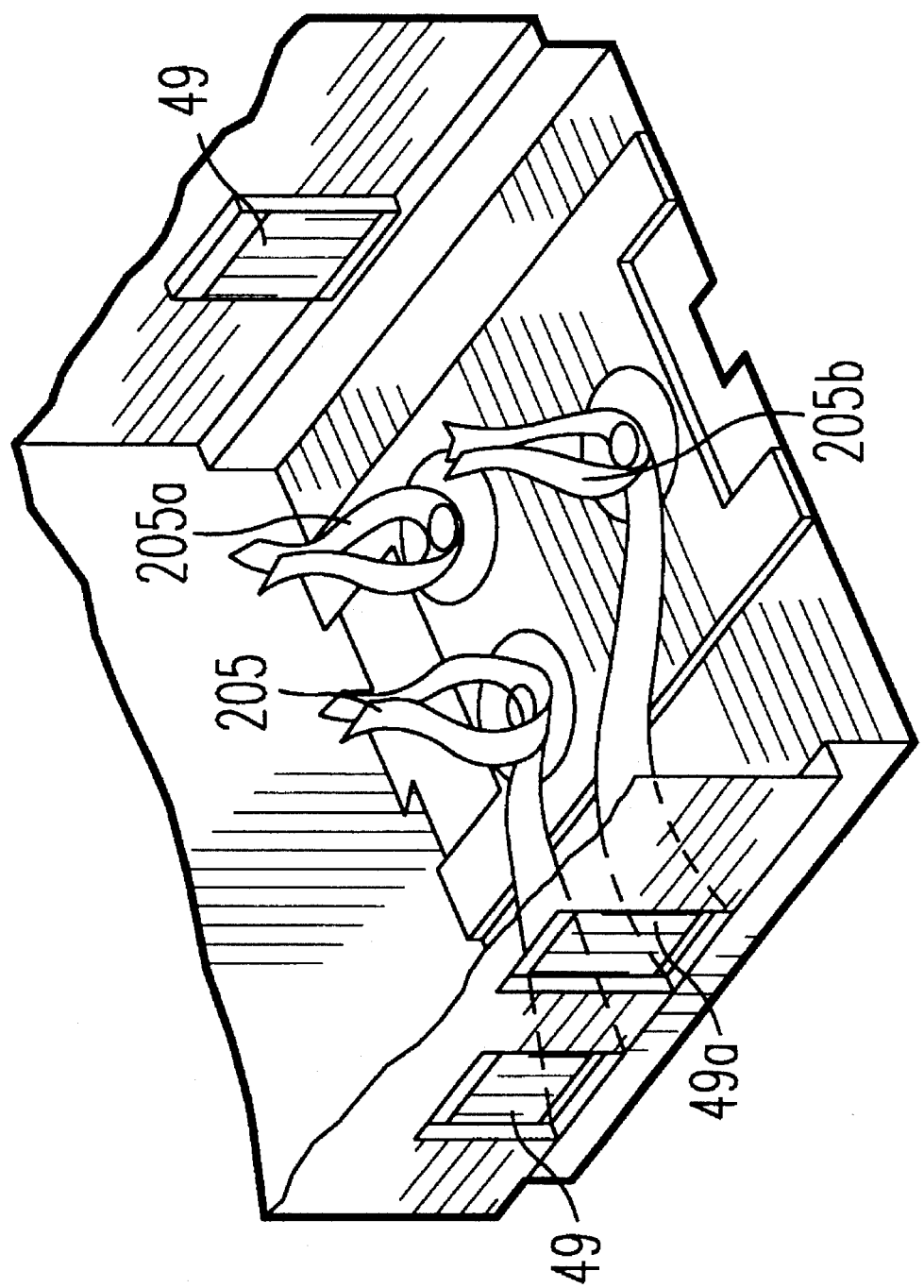
FIG. 6 is a perspective view of the interior of the plug of FIG. 4.

FIG. 6 shows the interior of the plug illustrated in FIG. 4. As noted in FIG. 6, the contacts 49 each include a lead which extend from the contacts to respective spring portions 205 and 205a which respectively receive the prongs from an electrical plug. The ground 49a leads to a further spring portion 205b which is similar to the spring portions 205 and 205a.

When the receptacle with the switch or plugs inserted therein is mounted in a wall surface, a cover plate can be mounted over the receptacle and bolted to the extended portion 19a which can prevent the inadvertent removal of plugs or switches from the receptacle.

Thus, the present invention provides for a modular receptacle which permits a user to selectively insert and remove switches or plugs from the receptacle without the need for removing the receptacle from the wall or cutting off the main power supply.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A modular pull-out assembly comprising:

a receptacle having first and second opposing walls which comprise opposing electrical contacts, one of said first and second opposing walls comprising a ground means, the receptacle further comprising opposing third and fourth walls each having receiving portions which extend substantially along a length of each of said third and fourth walls; and at least one switch or plug which is removably inserted into said receptacle;

wherein:

said at least one switch or plug comprises first and second opposing surfaces with opposing electrical contacts and a ground, a third surface with an indented portion and a fourth surface opposed to said third surface with a protruding portion, the switch or plug being removably slidable into the receptacle such that said opposing electrical contacts on said first and second walls of said receptacle respectively contact said opposing electrical contacts on said first and second opposing surfaces of said switch or plug, and one of said indented or protruding portions on said third and fourth surfaces of said switch or plug is respectively slidably fitted on one of said receiving portions on said third and fourth walls of said receptacle.

2. A modular pull-out assembly according to claim 1, wherein a plurality of said switches or plugs are inserted into said receptacle, said first and second opposing walls of said receptacle each comprising a plurality of opposing electrical contacts which contact opposing contacts on each of said plurality of switches or plugs inserted in said receptacle, each of said plurality of switches or plugs comprising said opposing protruding and indented portions such that a protruding or indented portion on one switch or plug is slidably fitted onto a protruding or indented portion on an adjacent switch or plug, and protruding and indented portions on outermost switches or plugs which face said first and second opposing walls of said receptacle are respectively slidably inserted on said receiving portions on said opposing walls of said receptacle.

3. A modular pull-out assembly according to claim 1, wherein said receptacle includes an elongated projecting member positioned at a center of said receptacle and having an end portion with a hole therein which permits the insertion of a screw for holding a top plate on said receptacle.

4. A modular pull-out assembly according to claim 1, wherein said at least one switch or plug comprises at least one switch, said at least one switch including:

first and second levers which each extend from said electrical contacts toward a center portion of the receptacle, edge portions of said first and second levers overlapping each other and maintaining a predetermined spacing therebetween;

a switch lever which is pivotally mounted on said switch, said switch lever having a wedge portion which during a pivoting movement of said switch lever pushes down one of said first and second levers so as to make contact with the other of said first and second levers.

5. A modular pull-out assembly according to claim 1, wherein said at least one switch or plug comprises at least one plug, said at least one plug comprises a positive inlet, a negative inlet and a ground, said plug further comprising leads which extend from each of said contacts to springs positioned in said plug so as to correspond to said positive inlet, said negative inlet and said ground.

6. A modular pull-out assembly comprising:

a receptacle having first and second opposing walls which comprise opposing electrical contacts, one of said first and second opposing walls comprising a ground means, the receptacle further comprising opposing third and fourth walls each having receiving portions which extend substantially along a length of each of said third and fourth walls; and at least one switch or plug which is removably inserted into said receptacle;

wherein said receptacle includes an elongated projecting member positioned at a center of said receptacle and having an end portion with a hole therein which permits the insertion of a screw for holding a top plate on said receptacle.

* * * * *